United States Patent Office 3,471,542
Patented Oct. 7, 1969

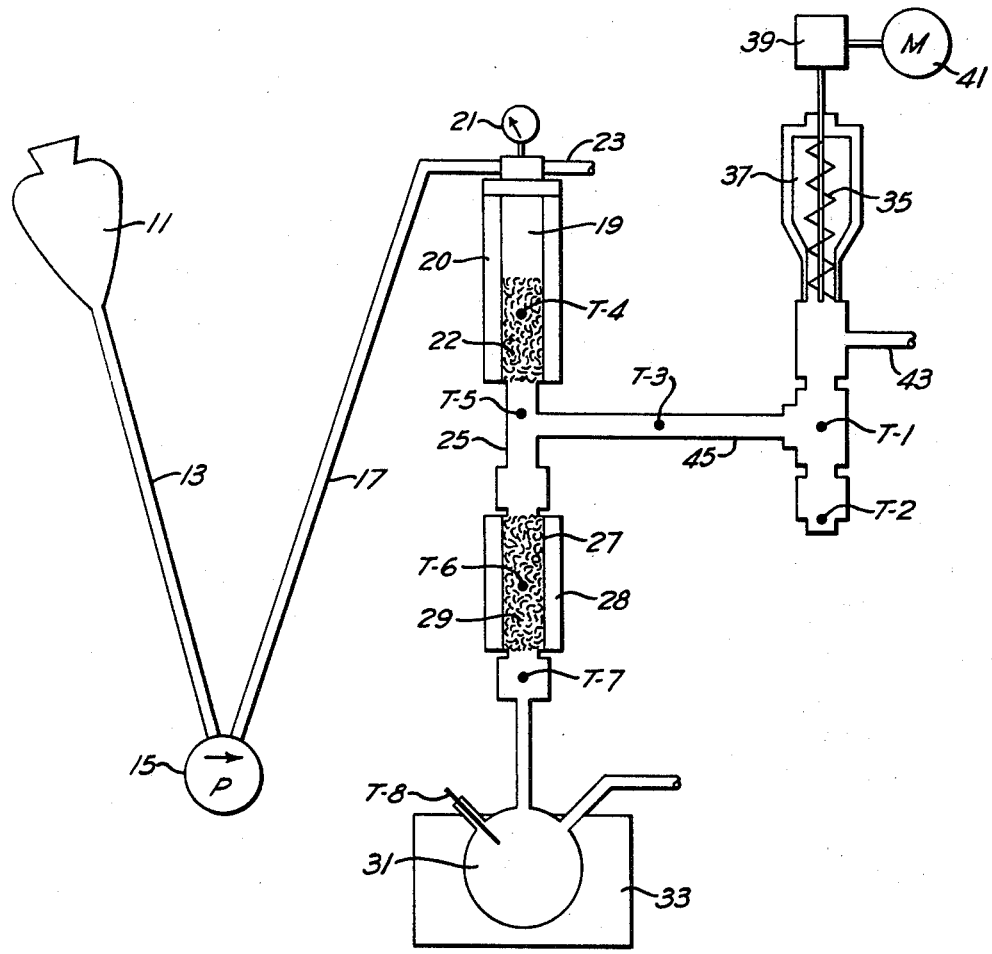

3,471,542
PREPARATION OF ISOCYANATES FROM ISO-
CYANIC ACID AND OLEFINS
James M. Cross and Sidney H. Metzger, New Martinsville, W. Va., assignors to Mobay Chemical Company, Pittsburgh, Pa., a corporation of Delaware
Filed Nov. 25, 1964, Ser. No. 413,797
Int. Cl. C07c 119/04
U.S. Cl. 260—453     8 Claims

ABSTRACT OF THE DISCLOSURE

Organic isocyanates are prepared by reacting an olefin with isocyanic acid in the vapor phase at a temperature of from about 300 to about 400° C. while passing the vapors over an activated silica or alumina catalyst.

---

This invention relates to organic isocyanates and more particularly, to a simplified method of preparation.

Several methods of preparing organic isocyanates have been disclosed in the literature. However, the only presently known commercially used method is by the phosgenation of organic amines. While very good yields are obtained by this method, it is complicated, in that large and various types of apparatuses are necessary in order to carry out the conversion.

It is an object of this invention to provide a new method of manufacturing organic isocyanates. It is another object of this invention to provide a simplified method of preparing organic mono- and polyisocyanates.

The foregoing objects and others which will become apparent from the following description are accomplished in accordance with the invention generally speaking, by providing a method of manufacturing organic isocyanates by reacting an olefin with isocyanic acid in the vapor phase at a temperature of from about 300° C. to about 400° C. while passing the vapors over an activated silica or alumina catalyst and then immediately quenching the vapors by cooling. The isocyanic acid used in the reaction is formed by the thermal decomposition of cyanuric acid. The vaporous isocyanic acid may be conveyed by an inert gas feed to a heated reaction zone containing the alumina catalyst. From a separate source, the olefin is passed through a heat exchanger and then passed over the heated catalyst. Immediately after the gases are passed through the reaction zone, they are quenched by being passed into a chamber which is cooled artificially. The reaction can be conducted at atmospheric pressures or at higher pressures.

The invention is more clearly understood by reference to the accompanying drawing. In this drawing, a source or reservoir 11 for the olefin is provided, which in conjunction with heated conduit 13, pump 15 and heated conduit 17, permits the introduction of the olefin into a heat exchanger 19. This heat exchanger 19 is provided with heaters 20 and contains suitable packing 22 such as Berl saddles, Raschig rings and the like, in order to increase the heat transfer. The heat exchanger 19 is also provided with a pressure gauge 21 and an inert gas inlet 23 near the top thereof. The base of the heat exchanger is connected by heated conduit 25 to a reaction chamber 27, which is heated by units 28 and filled with activated alumina catalyst 29. The outlet of the reaction chamber 27 is connected to a suitable receiving container 31 provided with a means for quenching 33.

The isocyanic acid is prepared in situ by the thermal decomposition of cyanuric acid. Cyanuric acid is introduced by a mechanical means including a worm gear 35, disposed within a chamber 37. The worm gear 35 is driven by a drive motor 41 through a gear box 39 to move the cyanuric acid along the desired path. Beneath the worm gear 35 is provided an inert gas feed 43 for propelling the cyanuric acid along the path of heated conduit 45. The cyanuric acid is thermally decomposed within the heated conduit 45 and passes into conduit 25 and then into the reaction chamber 27 as isocyanic acid. Thus, upon the simultaneous introduction of both the olefin and the isocyanic acid into the reaction chamber 27, isocyanate is formed and received into the receiving container 31. Temperature measuring means T1, T2, T3, T4, T5, T6, T7 and T8, are provided as shown in order to carefully note and control the temperature at different points in the apparatus.

In the preparation of isocyanates in accordance with this invention, the activated alumina or silica catalyst is introduced into the reaction chamber as powder or pellets and can be supported therein by any suitable means such as a perforated plate which will permit the gaseous reactants to pass through. The temperature within the reaction chamber and that of the catalyst is maintained at from about 300° C. to about 400° C. and preferably from about 350° C. to about 375° C.

The cyanuric acid is heated in order to cause the thermal decomposition thereof. The two inert gas feeds are provided merely for the purpose of moving the reactants through the system. Any suitable inert gas such as, for example, nitrogen, argon, krypton, neon and the like may be used.

Any suitable olefin such as butene-2, 1,2-diphenylethylene, hexene-2, hexadiene-2,4, heptene-3 may be used, however, those having at least one terminal double bond are preferred such as those having the formula

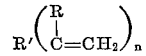

wherein $n$ is an integer; R is hydrogen or a monovalent organic radical and R' is hydrogen or an organic radical having a valence equal to the value of $n$.

In addition to hydrogen, R may be any monovalent organic radical such as, for example, methyl, ethyl, n-propyl, isopropyl, n-butyl, isobutyl, sec-butyl, t-butyl, n-pentyl and various positional isomers thereof, such as, for example, 1-methylbutyl, 2-methylbutyl, 3-methylbutyl, 1,1-dimethylpropyl, 1,2-dimethylpropyl, 2,2-dimethylpropyl, 1-ethylpropyl and the like; hexyl, heptyl, octyl, nonyl, decyl, undecyl, dodecyl, tridecyl, tetradecyl, pentadecyl, hexadecyl, heptadecyl, octodecyl, nondecyl, eicosyl and the like; phenyl, α-naphthyl, β-naphthyl, α-anthryl, β-anthryl, gamma anthryl, including the various monovalent radicals of indene, isoindene, acenaphthene, fluorene, phenanthrene, naphthacene, chrysene, pyrene, triphenylene; benzyl, α-phenylethyl, β-phenylethyl, α-phenylpropyl, β-phenylpropyl, gamma-phenylpropyl, α-phenylisopropyl, β-phenylisopropyl, α-phenylbutyl, β-phenylbutyl, gamma-phenylbutyl, delta - phenylbutyl, α - phenylisobutyl, β-phenylisobutyl, gamma - phenylisobutyl, α - phenyl-sec-butyl, β - phenyl - sec-butyl, gamma-phenyl-sec-butyl, β-phenyl-t-butyl, α'-naphthylmethyl, β'-naphthylmethyl, α-(α' - naphthyl) - ethyl, α-(β'-naphthyl)-ethyl, β-(α'-naphthyl)-ethyl, β-(β'-naphthyl)-ethyl, α-(α'-naphthyl)-propyl, α - (β' - naphthyl)-propyl, β-(α'-naphthyl)-propyl, β-(β'-naphthyl)-propyl, gamma-(α'-naphthyl)-propyl, gamma-(β'-naphthyl) - propyl, α-(α'-naphthyl)-isopropyl, α-(β'-naphthyl) - isopropyl, α - (α'-naphthyl)-butyl, α-(β'-naphthyl)-butyl, β-(α'-naphthyl)-butyl, β-(β'-naphthyl)-butyl, gamma - (α'-naphthyl)-butyl, gamma-(β'-naphthyl)-butyl, delta-(α'-naphthyl)-butyl, α-(α'-naphthyl)-isobutyl, α-(β'-naphthyl)-isobutyl, β-(α'-naphthyl)-isobutyl, β-(β'-naphthyl) - isobutyl, gamma - (α'-naphthyl)-isobutyl, gamma-(β'-naphthyl)-isobutyl, α-(α'-naphthyl)-sec-butyl, α-(β'-naphthyl) - sec - butyl, β-(α'-naphthyl)-sec-butyl, β-(β'-naphthyl) - sec - butyl, gamma - (α'-naphthyl)-sec-butyl, gamma-(β'-naphthyl)-sec-butyl, β-(α-naphthyl)-t-butyl, β-(β'-naphthyl)-t-butyl, and the like; ethenyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methylene-2-propenyl, 1-pentenyl, 2-pentenyl, 3-pentenyl, 4-pentenyl, 1-hexenyl, 2-hexenyl, 3-hexenyl, 4-hexenyl, 5-hexenyl, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadencenyl, octadecenyl, nondecenyl, eicosenyl and the like; o-tolyl, m-tolyl, p-tolyl, 2,3-xylyl, 2,4-xylyl, 2,5-xylyl, 2,6-xylyl, 3,4 - xylyl, 3,5 - xylyl, o - cumenyl, m - cumenyl, p-cumenyl, mesityl, o-ethylphenyl, m-etheylphenyl, p-ethylphenyl, 2 - methyl - α-naphthyl, 3-methyl-α-naphthyl, 4-methyl-α-naphthyl, 5-methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β - naphthyl, 2,3 - dipropyl-α-naphthyl, 5,8-diisopropyl-β-naphthyl and the like; cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl and the like.

In addition to hydrogen, R' may be any organic radical having a valence equal to the value of $n$ such as, any of the monovalent radicals set forth with respect to R, the divalent radicals similar to the monovalent radicals mentioned but having two free valences and also radicals having a higher valence such as 2,3-propanetriyl, 1,3-propanediyl-2-xylidene, 1,2,3,4,5,6-hexahexyl and the like.

Any suitable compound having at least one terminal double bond may be used, such as, for example, ethylene, propylene, butene-1, pentene-1, hexene-1, heptene-1, octene-1, nonene-1, decene-1, hexadecene-1, octadecene-1, styrene, vinylcyclohexane, isopropenylbenzene, vinyl naphthylene, isopropylethylene, 1,1-diphenylethylene, 2-methylbutene-1, allene, 4-hexadiene, 1,5-hexadiene, 1,4-pentadiene, 1,3-butadiene, p-methoxy - γ - methylstyrene, 1,6-heptadiene, 1,7-octadiene, 1,8-nonadiene, 1,9-decadiene, 1,15-hexadecadiene, 1,17-octadecadiene, 1,2,3-trivinylpropane, tetravinylneopentane, trivinylcyclohexane, trivinylbenzene, divinyl ketone, vinylchloride, vinylether, divinyl sulfide, ortho-, meta- and para-divinyl benzene, trivinyl benzene, p-nitrostyrene, ortho-, meta- and para-diisopropenylbenzene, 1,4-divinylnaphthylene, 1,5-divinylnaphthylene, ortho-, meta- and paravinyl toluene, 2,4-divinyl toluene, 2,6-divinyl toluene, 4,4'-divinyldiphenylmethane, trivinylhexahydrotoluene, 1-chloro-2,4-divinylbenzene, divinyl cyclobutane, divinyl cyclopentane, divinyl cyclohexane, diisopropenyl cyclopentane and the like.

The invention is further illustrated but not limited by the following examples in which parts are by weight unless otherwise specified.

EXAMPLE 1

Preparation of hexadecylisocyanate

Utilizing the apparatus as shown in the accompanying drawing 60 cc. of ⅛″ pellets of 0.5% platinum on alumina ars suspended within chamber 27. Cyanuric acid is fed at the rate of 1 g./minute by means of the rotating worm gear 35 from the chamber 37 through the heated pipe 45 which is maintained at a temperature of about 500° C. Nitrogen is fed through the two inert gas feed conduits 43 and 23 at a rate of 80 cc./minute. Hexadecene-1 is fed from the reservoir 11 through the heat conduit 13, pump 15 and heat exchanger 19 into the reaction chamber at a rate of about 2.6 grams/minute. The hexadecene-1 is heated in the heat exchanger 19 to a temperature of about 350° C. The temperature of the catalyst within the reaction chamber 27 is maintained at about 350° C.

The system is run for 45 minutes with the temperatures measured at each of the thermometers indicated below in Table I. After stopping both the cyanuric acid feed and the hexadecene-1, the entire system is purged with nitrogen. The material collected in the receiving container 31 cooled by means of an ice bath is extracted with benzene and the benzene is then removed by distillation in vacuo. Hexadecylisocyanate remains in the distillation flask. An infrared spectrum of the product showed the typically strong N=C=O absorbance at about 2280 cm.$^{-1}$, in addition to strong aliphatic C—H absorbance and other aliphatic bonds.

TABLE I.—TEMPERATURES, ° C.

| Time, minutes: | T-1 | T-2 | T-3 | T-4 | T-5 | T-6 | T-7 | T-8 |
|---|---|---|---|---|---|---|---|---|
| 0 | 510 | 494 | 510 | 353 | | 347 | 415 | 400 |
| 20 | 503 | 448 | 498 | 333 | | 353 | 390 | 425 |
| 45 | 490 | 480 | 490 | 350 | | 355 | 393 | 400 |

EXAMPLE 2

The apparatus in the accompanying drawing is operated utilizing 100 cc. of silica-alumina as a catalyst in place of the catalyst of Example 1. The temperatures throughout the apparatus as shown in the accompanying Table II. Hexadecene-1 is fed at the rate of 3.32 cc./minute. Nitrogen is fed at the rate of 80 cc./minute for both feeds 43 and 23. The material collected in container 31 is treated in the same manner set forth in Example 1 and the isocyanate recovered.

EXAMPLE 3

The procedure of Example 1 is conducted, however, the olefins set forth in Table III are utilized in place of hexadecene-1. The temperatures within the system are substantially the same and the feeds are substantially the same. In each instance, infrared establishes the presence of isocyanate.

It is of course to be understood that any of the olefins mentioned above may be converted to the isocyanate practicing the process of this invention and by substituting these compounds into the examples in place of the specific olefins used therein. Further, any alumina or silica catalysts set forth above may be used in place of those more specifically set forth in the examples.

TABLE II.—TEMPERATURES, ° C.

| Time, minutes: | T-1 | T-2 | T-3 | T-4 | T-5 | T-6 | T-7 | T-8 |
|---|---|---|---|---|---|---|---|---|
| 0 | 503 | 491 | 510 | 353 | 471 | 349 | 416 | 410 |
| 15 | 491 | 437 | 500 | 351 | 471 | 382 | 409 | 409 |
| 23 | 500 | 459 | 459 | 352 | 474 | 359 | 412 | 412 |
| 35 | 495 | 437 | 499 | 323 | 440 | 386 | 394 | 400 |
| 45 | 490 | 436 | 490 | 340 | 430 | 354 | 390 | 400 |
| 79 | 488 | 462 | 486 | 335 | 425 | 350 | 392 | 414 |

TABLE III

| | |
|---|---|
| 2,4-divinyltoluene | 1,4-divinylbenzene |
| 2,5-divinyltoluene | 1,4-divinylcyclohexane |
| 2,6-divinyltoluene | 2,4-diisopropenyltoluene |
| 1,6-diisopropenyl | styrene |
| 4,4'-divinyldiphenylmethane | ethene |
| 4,4'-divinyldiphenylpropane | isoprene |
| 1,4-diisopropenylcyclohexane | |

Although the invention has been described in considerable detail in the foregoing for the purpose of illustration, it is to be understood that such detail is solely for this purpose and that variations can be made by those skilled in the art without departing from the spirit and scope of the invention.

What is claimed is:

1. A method of preparing isocyanates which comprises simultaneously passing isocyanic acid and the vapor of an olefin over an activated alumina catalyst selected from the group consisting of platinum on alumina and silica-alumina catalysts heated to a temperature of from about 300° C. to about 400° C.

2. A method of preparing isocyanates which comprises simultaneously passing isocyanic acid and the vapor of an olefin having at least one terminal double bond over an activated alumina catalyst selected from the group consisting of platinum on alumina and silica-alumina catalyst heated to a temperture of from bout 300° C. to about 400° C.

3. The process of claim 2 wherein the temperature is from about 350° C. to about 375° C.

4. The process of claim 2 wherein the olefin has the formula

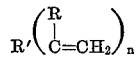

wherein $n$ is an integer, R is a member selected from the group consisting of hydrogen and a hydrocarbon radical, and R' is a member selected from the group consisting of hydrogen and a hydrocarbon radical having a valence equal to $n$.

5. The process of claim 2 wherein the olefin is a diene.

6. The process of claim 2 wherein the catalyst is a silica-alumina catalyst.

7. The process of claim 2 wherein the catalyst is a platinum on alumina catalyst.

8. A method of preparing isocyanates which comprises simultaneously passing isocyanic acid and the vapor of a 1-olefin over an activated silica-alumina catalyst heated to a temperature of from about 300 to about 400° C.

References Cited

Olah, G. A.: "Friedel-Crafts and Related Reactions," vol. I, Interscience Publishers, New York, pp. 329–31 (1963).

CHARLES B. PARKER, Primary Examiner

DOLPH H. TORRENCE, Assistant Examiner

U.S. Cl. X.R.

23—151, 289; 252—455, 466; 260—666, 668, 669, 677, 680